(12) United States Patent
Lefebvre et al.

(10) Patent No.: US 12,467,473 B1
(45) Date of Patent: Nov. 11, 2025

(54) AIRCRAFT ENGINE INCLUDING DIFFUSER SECURED TO A BEARING HOUSING

(71) Applicant: PRATT & WHITNEY CANADA CORP., Longueuil (CA)

(72) Inventors: Guy Lefebvre, St-Bruno-de-Montarville (CA); Lorenzo Sanzari, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/942,911

(22) Filed: Nov. 11, 2024

(51) Int. Cl.
F04D 29/44 (2006.01)
F01D 25/28 (2006.01)

(52) U.S. Cl.
CPC ............ F04D 29/444 (2013.01); F01D 25/28 (2013.01); *F05D 2220/323* (2013.01)

(58) Field of Classification Search
CPC .. F04D 29/444; F01D 25/28; F05D 2220/323; F02C 9/20; F02C 9/22; F02C 6/12
See application file for complete search history.

(56) References Cited

U.S. PATENT DOCUMENTS

| | | | |
|---|---|---|---|
| 2,421,833 A | 6/1947 | Cronstedt et al. | |
| 3,738,105 A | 6/1973 | Buchelt | |
| 5,105,625 A | 4/1992 | Bell, III et al. | |
| 5,156,534 A | 10/1992 | Burgy et al. | |
| 6,968,697 B2 | 11/2005 | Nguyen et al. | |
| 7,093,448 B2 | 8/2006 | Nguyen et al. | |
| 7,731,426 B2 | 6/2010 | Meacham et al. | |
| 7,931,437 B1 | 4/2011 | Johnson | |
| 8,056,336 B2 * | 11/2011 | Arnold | F01D 11/00 415/164 |
| 8,272,203 B2 | 9/2012 | Derenes et al. | |
| 9,970,295 B2 | 5/2018 | Fontaine et al. | |
| 9,982,561 B2 | 5/2018 | Budnick et al. | |
| 10,677,086 B2 | 6/2020 | Kobayashi et al. | |
| 10,815,832 B2 | 10/2020 | Staffier et al. | |
| 10,907,496 B2 * | 2/2021 | Shioya | F02C 6/12 |
| 11,060,449 B2 * | 7/2021 | Spierling | F02B 39/04 |
| 11,187,149 B2 | 11/2021 | Kobielski et al. | |

(Continued)

FOREIGN PATENT DOCUMENTS

DE 102014012123 A1 2/2016
JP 2002349276 12/2002

(Continued)

*Primary Examiner* — Brian Christopher Delrue
(74) *Attorney, Agent, or Firm* — NORTON ROSE FULBRIGHT CANADA LLP (57) ABSTRACT

A compressor assembly has: an impeller rotatable about a central axis, the impeller mounted on a shaft; a bearing housing extending around the central axis and radially supporting the shaft; and a diffuser downstream of the impeller, the diffuser having: an annular member extending circumferentially around the central axis, vanes circumferentially distributed around the central axis and protruding from one of the annular member and the bearing housing, the vanes extending from bases at the one of the annular member and the bearing housing to tips at the other of the annular member and the bearing housing, and lug and slot connections defined between the annular member and the bearing housing to secure the annular member to the bearing housing.

20 Claims, 10 Drawing Sheets

(56) References Cited

U.S. PATENT DOCUMENTS

| | | | |
|---|---|---|---|
| 11,643,218 B2 | 5/2023 | Blagojevic | |
| 12,065,950 B1 | 8/2024 | Lefebvre et al. | |
| 2007/0240415 A1* | 10/2007 | Julien | F02C 6/12 60/39.1 |
| 2009/0272112 A1* | 11/2009 | Arnold | F01D 11/00 60/602 |
| 2010/0266430 A1* | 10/2010 | Shimizu | F02B 39/10 417/423.8 |
| 2010/0310365 A1* | 12/2010 | Matsuyama | F01D 17/165 415/212.1 |
| 2011/0008162 A1 | 1/2011 | Yokoyama et al. | |
| 2011/0311355 A1 | 12/2011 | Benkler et al. | |
| 2013/0064655 A1 | 3/2013 | Smatloch et al. | |
| 2013/0156567 A1 | 6/2013 | Nagae et al. | |
| 2013/0312704 A1* | 11/2013 | Taylor | F02B 41/10 123/44 C |
| 2016/0245161 A1* | 8/2016 | Thomassin | F02C 7/14 |
| 2017/0204743 A1 | 7/2017 | Yokoyama et al. | |
| 2017/0218760 A1 | 8/2017 | Fontaine et al. | |
| 2018/0179909 A1* | 6/2018 | Nishioka | F01D 9/026 |
| 2018/0216494 A1 | 8/2018 | Azuma et al. | |
| 2019/0071987 A1* | 3/2019 | Shioya | F01D 9/041 |
| 2019/0316516 A1 | 10/2019 | Arai | |
| 2020/0182257 A1 | 6/2020 | Uemura et al. | |
| 2020/0200073 A1 | 6/2020 | Uemura et al. | |
| 2020/0386149 A1* | 12/2020 | Spierling | F02B 37/166 |

FOREIGN PATENT DOCUMENTS

| | | | |
|---|---|---|---|
| JP | 3757999 B2 | 3/2006 | |
| JP | 4370232 B2 | 11/2009 | |
| WO | 2016184549 A1 | 11/2016 | |
| WO | 2016184550 A1 | 11/2016 | |

\* cited by examiner

FIG. 11

AIRCRAFT ENGINE INCLUDING DIFFUSER SECURED TO A BEARING HOUSING

TECHNICAL FIELD

The disclosure relates generally to aircraft engines and, more particularly, to vane diffusers used in such engines.

BACKGROUND

In some engine architectures, vane diffusers are used downstream of a centrifugal compressor to orient the flow exiting the compressor before feeding said flow to another component, such as a combustor or an internal combustion engine. Existing vane diffusers and methods of assembling the same are satisfactory to some extend, but improvements are sought.

SUMMARY

In one aspect, there is provided a compressor assembly comprising: an impeller rotatable about a central axis, the impeller mounted on a shaft; a bearing housing extending around the central axis and radially supporting the shaft; and a diffuser downstream of the impeller, the diffuser having: an annular member extending circumferentially around the central axis, vanes circumferentially distributed around the central axis and protruding from one of the annular member and the bearing housing, the vanes extending from bases at the one of the annular member and the bearing housing to tips at the other of the annular member and the bearing housing, and lug and slot connections defined between the annular member and the bearing housing to secure the annular member to the bearing housing.

The compressor assembly described above may include any of the following features, in any combinations.

In some embodiments, the vanes are defined by the annular member, the lug and slot connections including slots defined through the bearing housing receiving lugs protruding from the vanes.

In some embodiments, the lug and slot connections comprise braze or weld joints within gaps extending around the lugs, the lugs secured within the slots via the braze joints.

In some embodiments, a number of the lugs corresponds to a number of the vanes.

In some embodiments, a connection between the annular member and the bearing housing is devoid of bolt.

In some embodiments, the lugs are elongated along a direction of chords of the vanes.

In some embodiments, a compressed air collector extends around the central axis, the compressed air collector fluidly connected to flow passages defined between the vanes.

In another aspect, there is provided an aircraft engine, comprising: an internal combustion engine; a compressor including an impeller rotatable about a central axis, the impeller mounted on a shaft; a bearing housing extending around the central axis and radially supporting the shaft; and a diffuser downstream of the impeller, the diffuser fluidly connecting the compressor to the internal combustion engine, the diffuser having: an annular member extending circumferentially around the central axis and axially facing the bearing housing to define a flow path therebetween, vanes circumferentially distributed around the central axis and protruding axially from one of the annular member and the bearing housing across the flow path, the vanes extending from bases at the one of the annular member and the bearing housing to tips at the other of the annular member and the bearing housing, the vanes dividing the flow path into a plurality of inter-vane flow passages, and lugs protruding from the tips of the vanes outside of the flow path, the lugs received within correspondingly-shaped slots defined by the other of the annular member and the bearing housing, the lugs secured within the slots.

The aircraft engine described above may include any of the following features, in any combinations.

In some embodiments, the vanes are defined by the annular member, the slots defined through the bearing housing.

In some embodiments, braze or weld joints are within gaps extending around the lugs, the lugs secured within the slots via the braze joints.

In some embodiments, a number of the lugs corresponds to a number of the vanes.

In some embodiments, a connection between the annular member and the bearing housing is devoid of bolt.

In some embodiments, the lugs are elongated along a direction of chords of the vanes.

In some embodiments, a compressed air collector extends around the central axis, the internal combustion engine fluidly connected to the inter-vane flow passages via the compressed air collector.

In some embodiments, the compressed air collector includes: a collector base abutting a front face of the annular member opposite the bearing housing, and a volute extending around the central axis and from the collector base to a flange, the flange secured to a housing flange of the bearing housing.

In some embodiments, a flow circulating area defined by the volute increases along a flow direction.

In some embodiments, a turbine includes a turbine rotor rotatable about the central axis, a scroll case having an inlet fluidly connected to the internal combustion engine and an outlet fluidly connected to the turbine, and a conduit extending around the central axis from the inlet to the outlet, and a turbine support case secured to the bearing housing, the turbine support case having spokes distributed around the central axis and extending along a direction having an axial component relative to the central axis, the spokes extending through the scroll case and radially supported by the bearing housing, a spoke of the spokes having a distal end secured to the bearing housing.

In some embodiments, the scroll case includes vanes extending in a direction having an axial component relative to the central axis and across the conduit.

In some embodiments, each of the spokes extends within a respective one of the vanes.

In some embodiments, the spokes are free of connection to the vanes.

DESCRIPTION OF THE DRAWINGS

Reference is now made to the accompanying figures in which.

DETAILED DESCRIPTION

Figure 1:
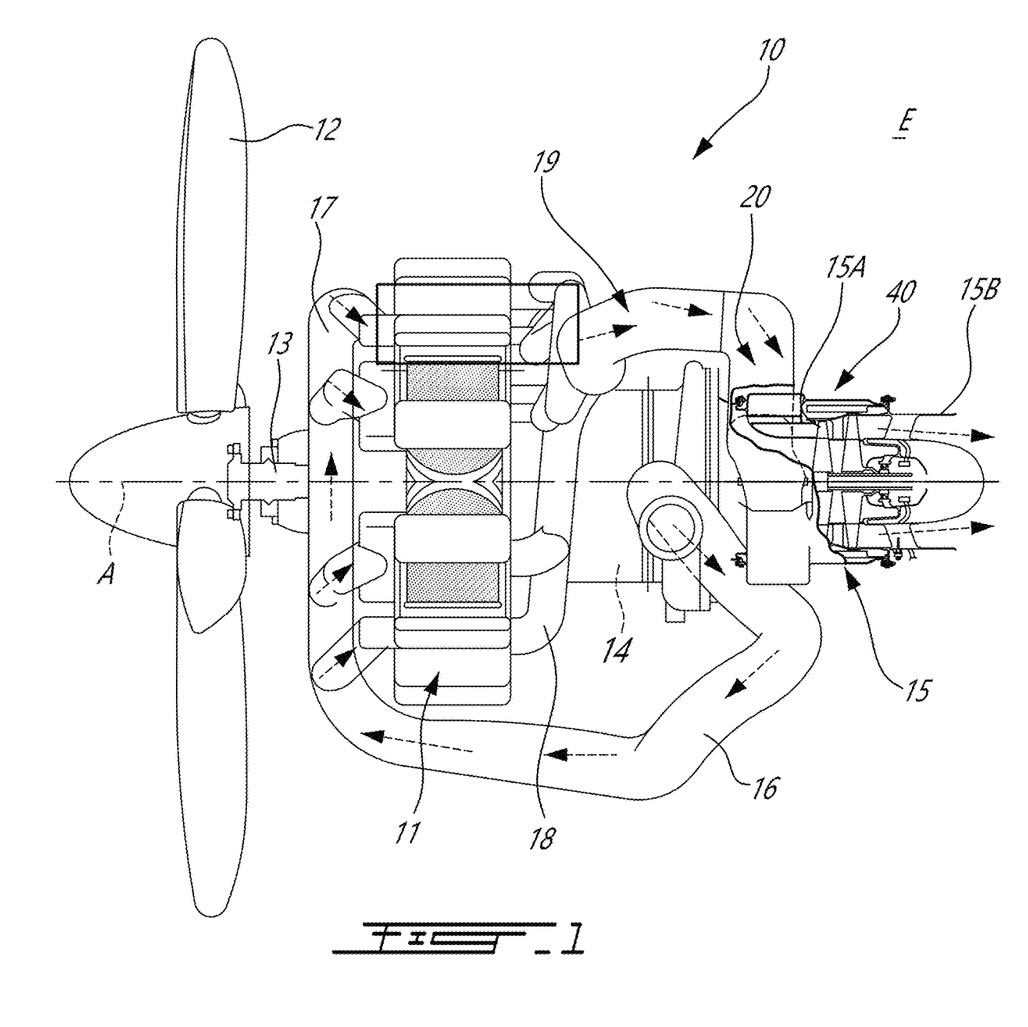
FIG. 1 is a schematic side view of an aircraft engine.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. It will be appreciated that the thermal engine module 11 may include any suitable engine, such as a gas turbine engine, a rotary engine, a piston engine, and so on. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine module 11 via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure. The aircraft engine 10 further includes a turbine assembly 15 having an axially facing turbine inlet 15A fluidly connected to an engine outlet of the thermal engine module 11. The turbine 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10. In some embodiments, the aircraft engine 10 may be a hybrid engine including an electric motor drivingly engaged to the output shaft 13 to assist the thermal engine module 11 in driving the output shaft 13 and the rotatable load (e.g., propeller 12) mounted thereto.

Figure 2:
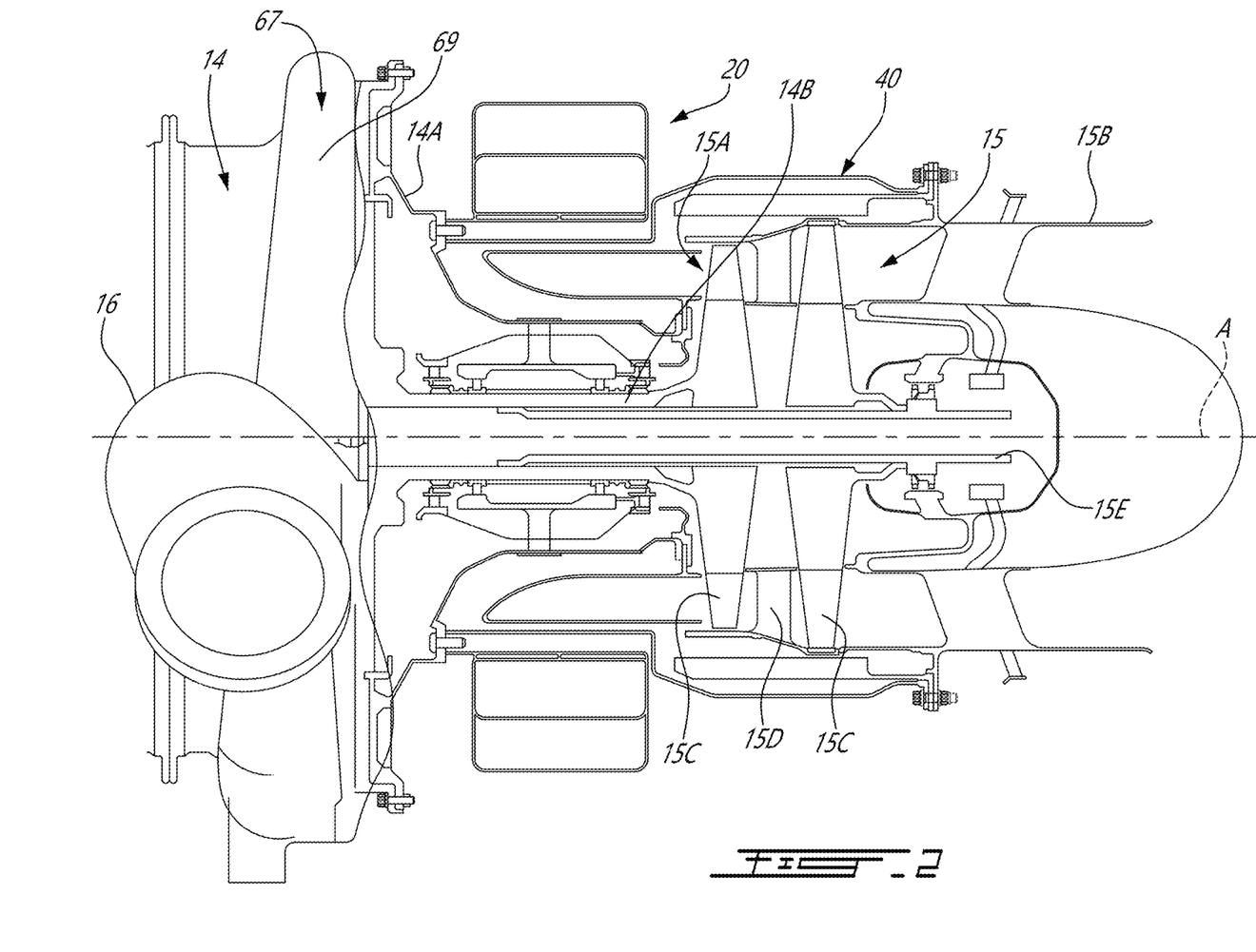
FIG. 2 is a side cross-sectional view of a portion of the aircraft engine of FIG. 1 illustrating a hot section of the aircraft engine.

Referring jointly to FIGS. 1-2, in one or more embodiment(s), the turbine 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine module 11. Therefore, the turbine 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers or by a combustor of the thermal engine module 11. The exhaust manifold 18 collects the combustion gases from the different combustion chambers and flows these combustion gases to a combustion engine exhaust pipe 19 that feeds the combustion gases to the turbine 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine 15 are contemplated without departing from the scope of the present disclosure.

As schematically depicted by the flow arrows in FIG. 1, the combustion gases are flowing within the combustion engine exhaust pipe 19 and reach the turbine 15 in a direction being mainly radial relative to the central axis A and which may include a circumferential component relative to the central axis A. However, the turbine 15 includes an axial turbine and therefore the turbine inlet 15A receives the combustion gases along a direction being mainly axial relative to the central axis A. To redirect the combustion gases from a direction being mainly radial to a direction being mainly axial, that is, to decrease a radial component of a direction of the combustion gases, the aircraft engine 10 further includes a scroll case 20 that regulates and reorients the combustion gases so that they meet an upstream most of the stages of the turbine 15 at the most appropriate angle of attack. In the embodiment shown, the flow of combustion gases exiting the scroll case 20 meets a first stage rotor 15C of the turbine 15 before meeting a stator thereof. The scroll case 20 may therefore be used to adequately orient the combustion gases at the most appropriate angle to meet the upstream-most airfoils of the turbine 15, which are herein part of one of the first stage rotors 15C.

Figure 3:
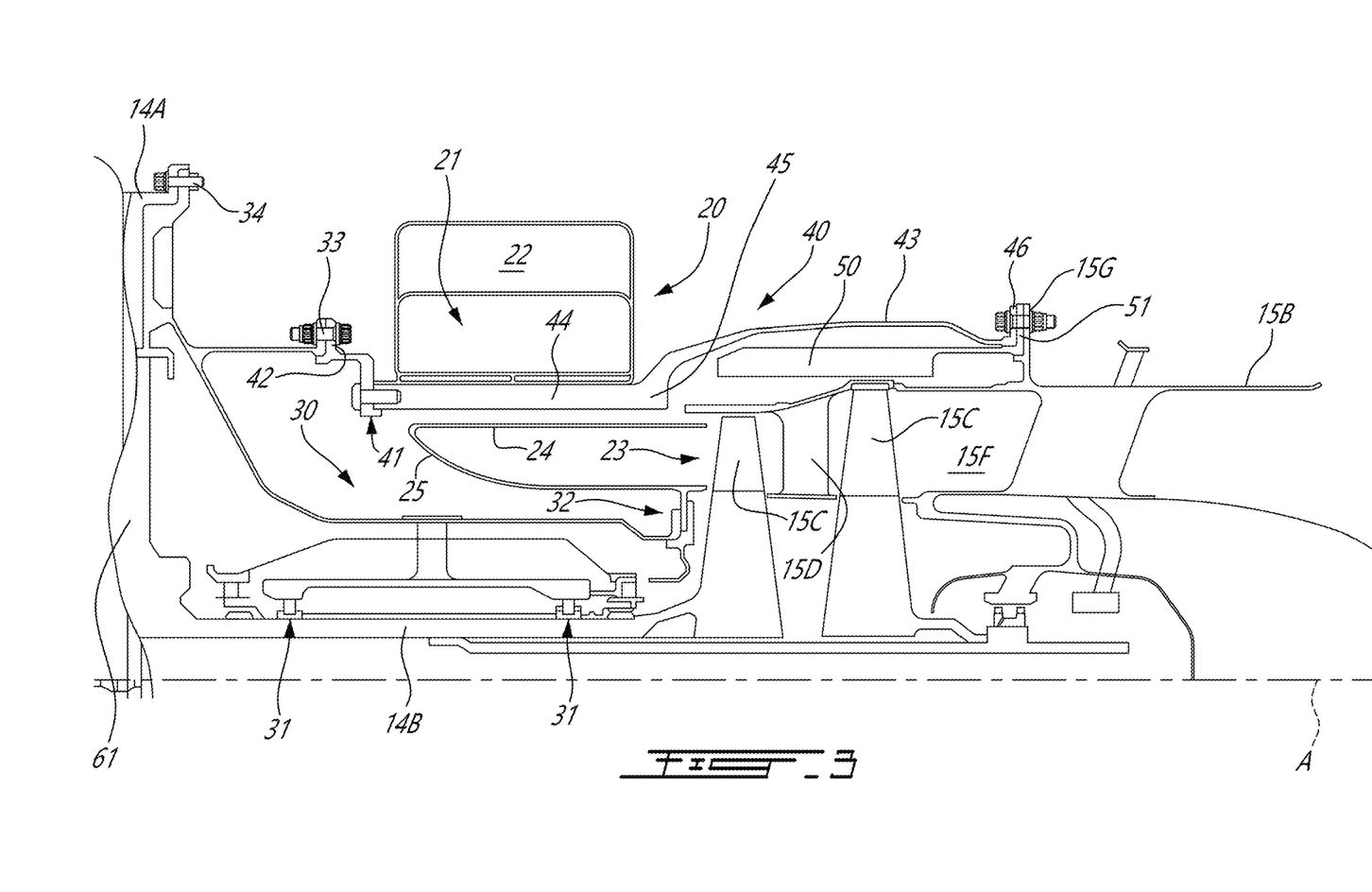
FIG. 3 is an enlarged view of a portion of FIG. 2.

Referring to FIG. 3, as shown in the exemplified embodiment, the scroll case 20 may be provided in form of a unitary body or mono-case comprising a conduit 21 extending around the central axis A from an inlet 22 to an outlet 23. The inlet 22 is fluidly connected to the combustion engine exhaust pipe 19, whereas the outlet 23 is fluidly connected to the turbine inlet 15A (FIG. 2) of the turbine 15. According to the illustrated embodiment, the inlet 22 of the conduit 21 has a tangential component and the outlet 23 is an annular outlet facing axially in a rearward direction and in alignment with an annular gas path 15F of the turbine 15. This configuration allows injecting the combustion gases in a direction being mainly axial relative to the central axis A to meet the axial inlet of the turbine 15. Vanes 24 may be provided in the conduit 21 to direct and regulate the flow of combustion gases. The vanes 24 may be omitted in some embodiments. The conduit 21 of the scroll case 20 is in this embodiment disposed axially forwardly of the turbine 15.

The conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

The inventors have found that in engine running conditions, the thermal distortions are non-uniform in the non-axisymmetric portion of the scroll case 20. Consequently, using the scroll case 20 to secure the turbine exhaust case 15B may increase tip clearance of the rotors 15C of the turbine 15. In other words, radial thermal growth of the scroll case 20 during use of the engine may move the turbine exhaust case 15B radially outwardly, thus pulling radially on shrouds disposed around the rotors 15C. This may increase tip clearance and, as a result, may impair performance. As will be seen hereafter, a turbine support case arrangement may be used to alleviate these drawbacks.

As illustrated on FIG. 3, a compressor case 14A of the compressor 14 is radially supported by a bearing housing 30. It will be appreciated that that any suitable support structure may be used for support the compressor case 14A. For instance, the support structure may be any static component of the engine, such as a support flange and so on. Bearings 31 are rollingly engaged to the bearing housing 30 and radially support a shaft of the engine. The scroll case 20 is secured to a rear end 32 of the bearing housing 30. In the exemplified embodiment, the scroll case 20 has a radially-inner wall 25 that defines a flange at its rear end. The flange of the radially-inner wall 25 is received within an annular groove defined by the rear end 32 of the bearing housing 30. Other configurations are however contemplated. Therefore, the scroll case 20 may not rely on the turbine exhaust case 15B for structural support.

In the disclosed embodiment, a turbine support case 40 is used to secure the turbine exhaust case 15B to the compressor case 14A of the compressor 14. As will be explained below, the turbine support case 40 is independent from the scroll case 20 such that thermal growth of the scroll case 20 may not be transmitted to the turbine exhaust case 15B. Therefore, the turbine exhaust case 15B is secured to the compressor case 14A via the turbine support case 40 independently of the scroll case 20. In the present disclosure, the expression "independent" or "independently" in "independently of the scroll case 20" implies that a load path extends from the compressor case 14A to the turbine exhaust case 15B through the turbine support case 40 without intersecting the scroll case 20. The scroll case 20 is therefore free from intersection to the load path from the compressor case 14A to the turbine exhaust case 15B. The scroll case 20 is thus not part of the load path from the compressor case 14A to the turbine exhaust case 15B and loads generated by the turbine 15 on the turbine exhaust case 15B are transmitted to the compressor case via the turbine support case 40 without assistance from the scroll case 20. The scroll case 20 is thus outside the load path that extends through the turbine support case 40. The scroll case 20 may thus be structurally floating relative to the turbine support case 40.

Figure 4:
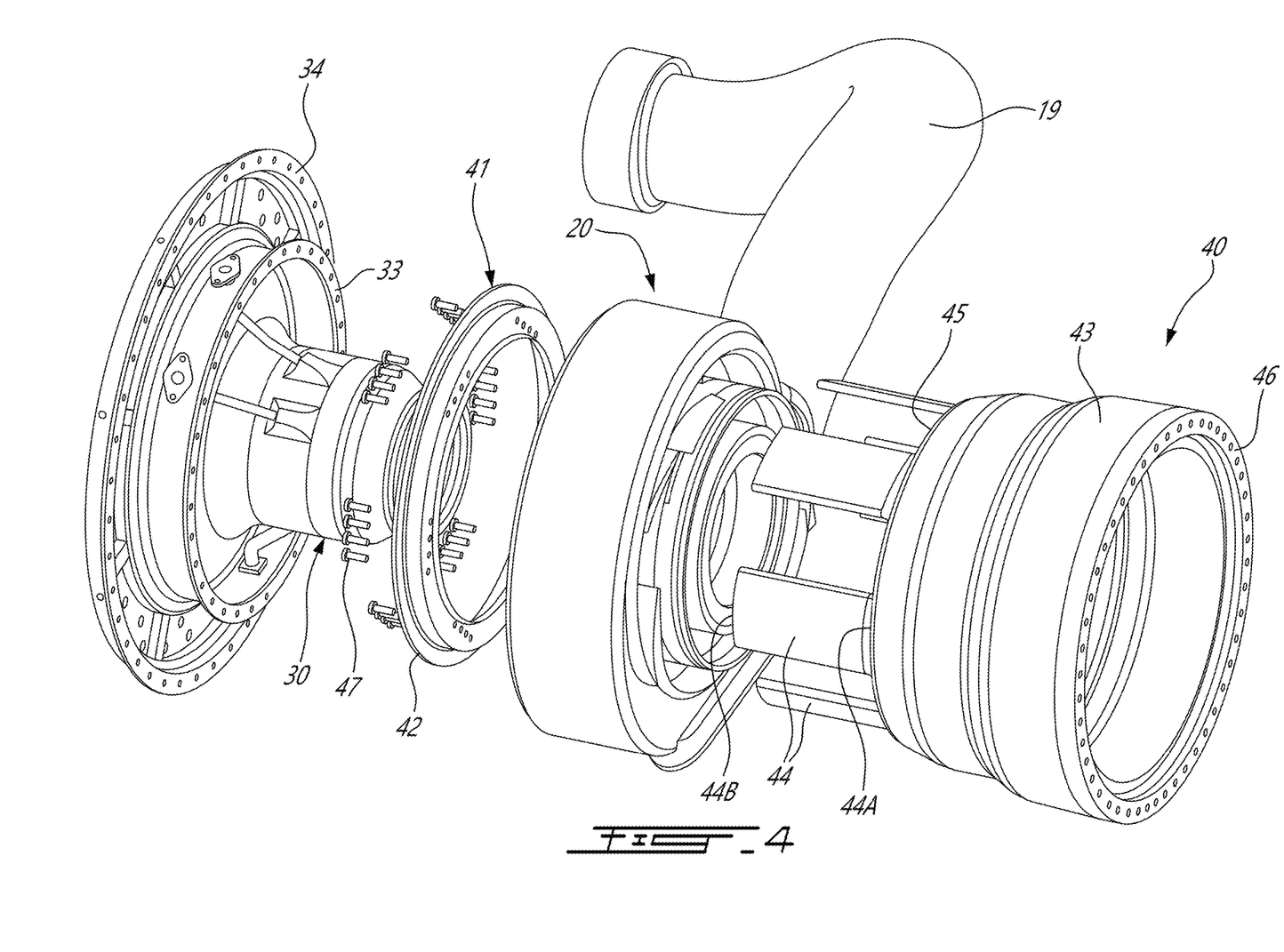
FIG. 4 is a three-dimensional exploded view of a turbine assembly for the aircraft engine of FIG. 1, including a bearing housing, a scroll case, and a turbine support case.

Referring to FIG. 4, the turbine support case 40 has a portion that axially overlaps the scroll case 20 and is secured to an annular member 41, which is itself secured to the bearing housing 30 or any other suitable support structure. More specifically, the annular member 41 has a flange 42 secured (e.g., bolted) to a first flange 33 of the bearing housing 30. The bearing housing 30 further has a second flange 34, which may be disposed radially outwardly of the first flange 33 and axially offset from the first flange 33, for being secured (e.g., bolted) to a mating flange of the compressor case 14A.

The turbine support case 40 includes a wall 43 extending around the central axis A. The wall 43 may be cylindrical, frustoconical, or any other suitable shape. The wall 43 may extend a full circumference around the central axis A. The turbine support case 40 further includes spokes 44 protruding from the wall 43. More specifically, the turbine support case 40 includes an annular axial wall 45 extending radially inwardly from the wall 43. The spokes 44 protrude in a direction having an axial component relative to the central axis A from the annular axial wall 45 and away from the wall 43. The spokes 44 may be parallel to the central axis A. An annular flange 46 is provided at a rear end of the wall 43 and is secured (e.g., bolted) to a mating flange 15G (FIG. 3) of the turbine exhaust case 15B.

As shown in FIG. 3, the wall 43 axially overlaps at least a portion of the turbine 15. A containment ring 50 may be secured to the flange 15G of the turbine exhaust case 15B via containment ring flange 51, which may be sandwiched between the annular flange 46 of the turbine support case 40 and the flange 15G of the turbine exhaust case 15B. The containment ring 50 is, in this embodiment, disposed radially between the wall 43 of the turbine support case 40 and at least one of the rotors 15C of the turbine 15.

The spokes 44, six in the illustrated embodiment, but more or less may be used, extend from proximal ends 44A at the annular axial wall 45 to distal ends 44B. The distal ends 44B of the spokes 44 are secured to the annular member 41 as will be explained further below. The distal ends 44B of the spokes define threaded apertures 44C (FIG. 5) threadingly engageable by fasteners 47 (e.g., bolts) extending through correspondingly-shaped apertures defined through the annular member 41 and threadingly engaged to the threaded apertures 44C for securing the spokes 44 to the annular member 41, which is itself secured to the bearing housing 30.

Figure 5:
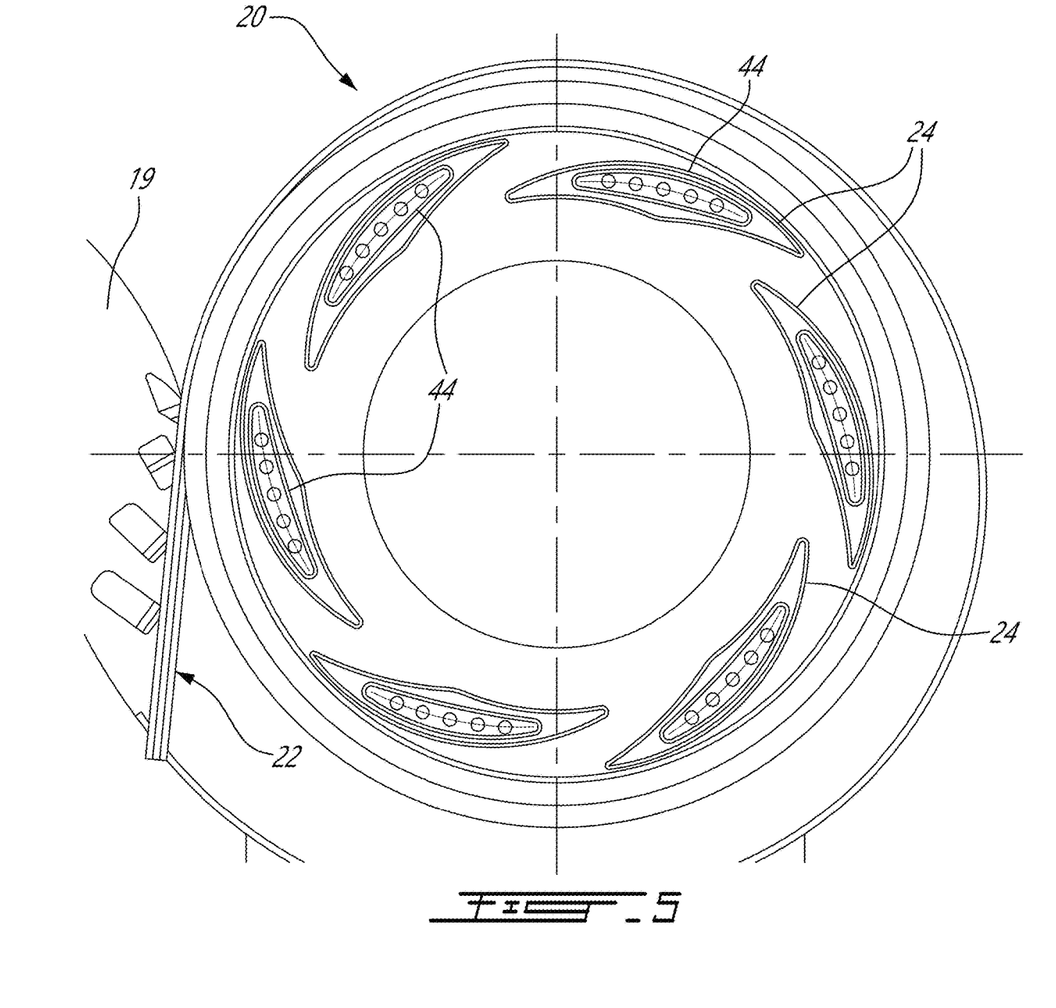
FIG. 5 is a cross-sectional view taken on a plane normal to a central axis of the aircraft engine of FIG. 1, illustrating the turbine support case and the scroll case.

Referring to FIGS. 4 and 5, in the embodiment shown, each of the spokes 44 is received within a respective one of the hollow vanes 24 of the scroll case 20. The spokes 44 therefore axially overlap the vanes 24. Thus, the spokes 44 may be isolated from combustion gases flowing through the scroll case 20 by the vanes 24. The spokes 44 may be free of connection to the vanes 24. In other words, outer surfaces of the spokes 44 may be free of contact with inner surfaces of the vanes 24. An annular gap may be provided between the inner surface of each vanes 24 and the associated spokes 44 extending internally therethrough. The vanes 24 may move axially, radially, and/or circumferentially relative to the spokes 44 without transferring any forces to the spokes 44, and vice versa. Put differently, the scroll case 20 is free from direct connection to the turbine support case 40. In other words, the scroll case 20 is free of contact, attachment, so on with the turbine support case 40. The spokes 44 of this embodiment have an elongated, airfoil-like shape to substantially match a shape of the vanes 24. However, the shape of the spokes 44 may be different. The spokes 44 may be circular, oval, square, rectangular in cross-section and so on, without departing from the scope of the present disclosure.

Figure 6:
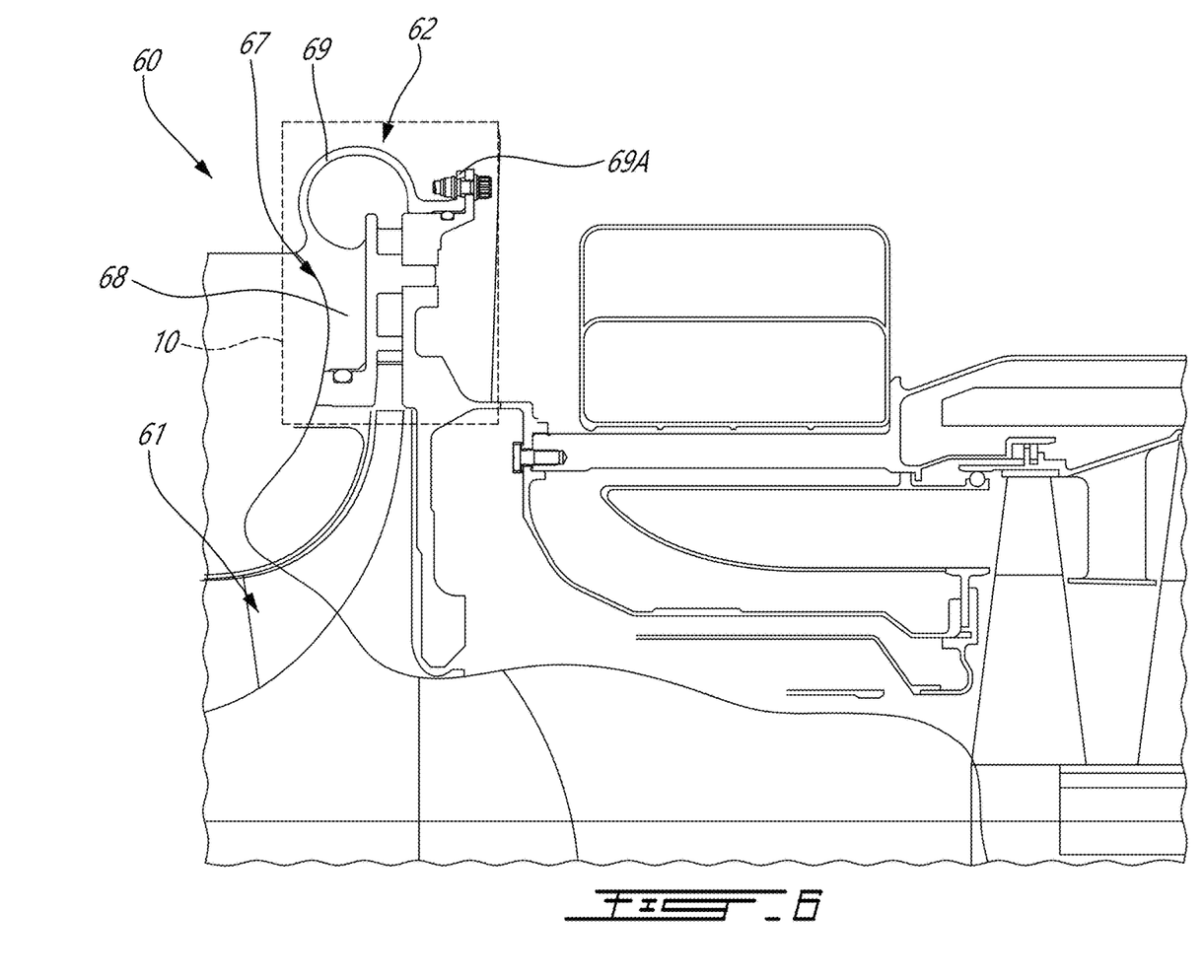
FIG. 6 is an enlarged view of another portion of FIG. 2 illustrating a compressor assembly.

Referring now to FIG. 6, a portion of FIG. 3 is illustrated. The compressor 14 is part of a compressor assembly 60, which is described below in greater detail.

The compressor assembly 60 includes the compressor 14 which includes an impeller 61 rotatable about the central axis A1. The impeller 61 is mounted on a shaft 14B (FIG. 2). This shaft 14B is engaged by one or more of the rotor(s) 15C of the turbine 15. The compressor assembly 60 includes a diffuser 62 downstream of the impeller 61 relative to a flow of compressed air flowing through the compressor 14. The diffuser 62 is fluidly connected to the thermal engine module 11. The bearing housing 30 is described in further detail with reference to FIGS. 7-8 followed by the diffuser with reference to FIGS. 9-10.

Figure 7:
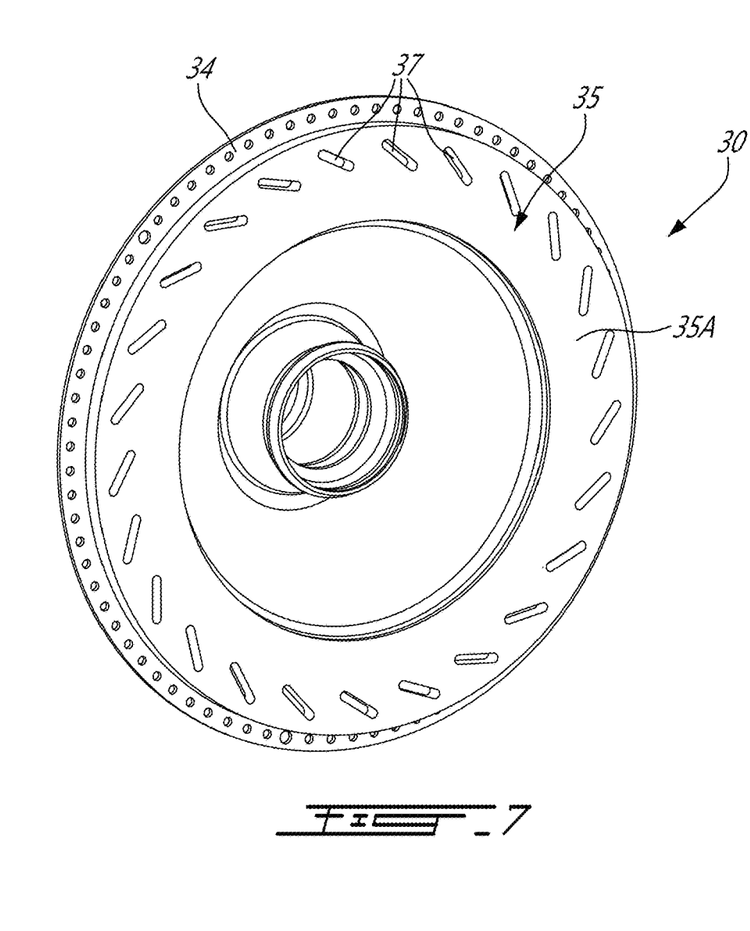
FIG. 7 is a front three-dimensional view of the bearing housing of FIG. 4.
Figure 8:
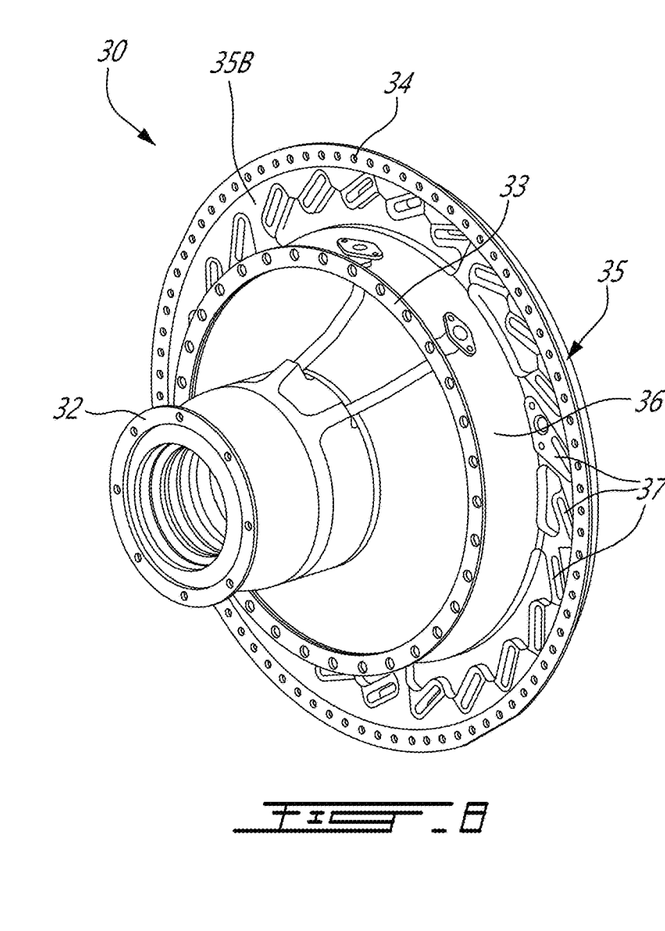
FIG. 8 is a rear three-dimensional view of the bearing housing of FIG. 4.

Referring to FIGS. 7-8, the bearing housing 30 includes an annular wall 35 extending radially inwardly relative to the central axis from the second flange 34. The annular wall 35 has a front face 35A and a rear face 35B opposite the front face 35A. The front face 35A is oriented towards the impeller 61. The bearing housing 30 further includes a circumferential wall 36 extending transversally from a radially-inner end of the annular wall 35 to the first flange 33. The annular wall 35 is thus located radially between the first flange 33 and the second flange 34. In the embodiment shown, slots 37 are circumferentially distributed around the central axis and extend through the annular wall 35, from the front face 35A to the rear face 35B. In an alternative embodiment, the slots 37 may be close-ended. That is, the slots 37 may extend from the front face 35A towards the rear face 35B, but end before reaching the rear face 35B.

Figure 9:
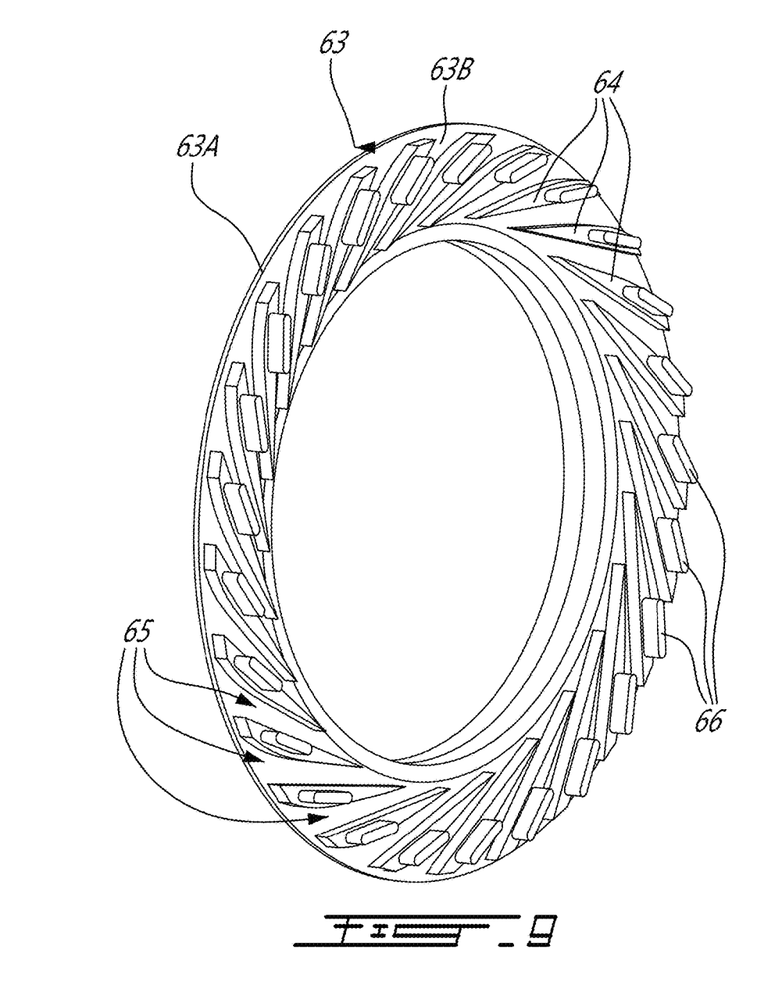
FIG. 9 is a three-dimensional view of an annular member of the compressor assembly of FIG. 6.
Figure 10:
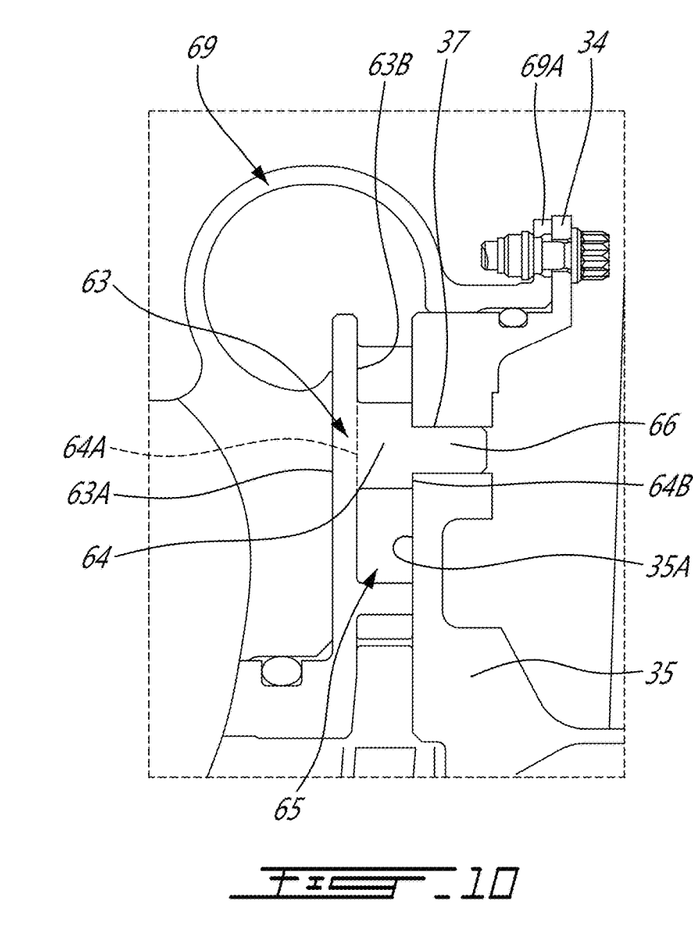
FIG. 10 is an enlarged view of zone 10-10 on FIG. 6.

Referring now to FIGS. 9-10, the diffuser 62 includes an annular member 63 extending circumferentially around the central axis A1 and vanes 64 circumferentially distributed around the central axis A1. The vanes 64 protrude along a direction having an axial component relative to the central axis from the annular member 63. More specifically, the annular member 63 has a front face 63A and a rear face 63B opposite the front face 63A. The vanes 64 protrude from the rear face 63B. The rear face 63B of the annular member 63 faces the front face 35A of the annular wall 35 of the bearing housing 30. It will be appreciated that, in an alternate embodiment, the vanes 64 may be defined by the annular wall 35 of the bearing housing 30 and the slots 37 may be defined through the annular member 63 without departing from the scope of the present disclosure.

In the embodiment shown, the vanes 64 protrude from the annular member 63 and extend from bases 64A at the annular member 63, herein at the rear face 63B of the annular member 63, to tips 64B at the annular wall 35 of the bearing housing 30, herein at the front face 35A of the annular wall 35 of the bearing housing 30. More specifically, the tips 64B of the vanes 64 abut the front face 35A of the annular wall 35 of the bearing housing 30. Flow passages 65 are defined between the vanes 64. The flow passages 65 fluidly connect an outlet of the impeller 61 to the internal combustion engine as discussed further below.

Still referring to FIGS. 9-10, lugs 66 protrude from the tips 64B of the vanes 64. The lugs 66 are received within the slots 37 defined the annular wall 35 of the bearing housing 30. The slots 37 therefore have a shape or profile that correspond to that of the lugs 66. The lugs 66 are secured within the slots 37. In some embodiments, a number of the lugs 66 corresponds to a number of the vanes 64, but this need not be the case. For instance, there may be less lugs 66 than vanes 64 in some embodiments.

Figure 11:
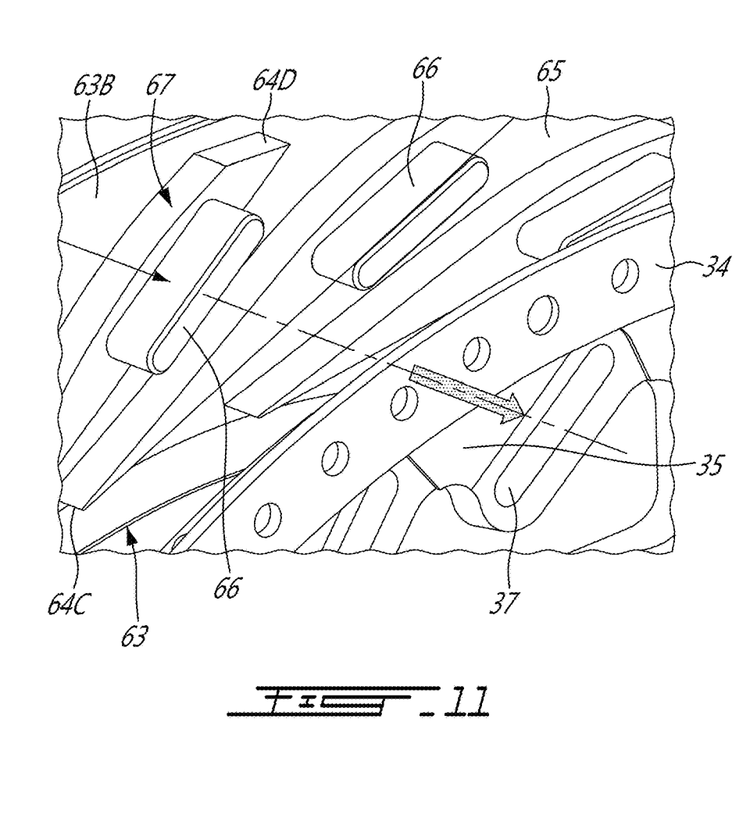
FIG. 11 is a three-dimensional exploded view of a portion of the diffuser.

Referring more particularly to FIG. 11, the vanes 64 have leading edges 64C and trailing edges 64D downstream of the leading edges 64C. The vanes 64 extend at an angle relative to the central axis. In other words, the vanes 64 extend both radially outwardly and circumferentially relative to the central axis A1 from the leading edges 64C to the trailing edge 64D. The flow passages 65 defined between each pair of the vanes 64 are therefore also angled relative to the central axis to adequately receive and orient the compressed air exiting the impeller 61. A width of the flow passages 65 increases along the flow direction from the leading edges 64C to the trailing edges 64D. This has for effect of reducing a velocity of the flow and, consequently, increasing the pressure.

The lugs 66 extend substantially parallel to the vanes 64. That is, the lugs 66 may be aligned substantially parallel to chords of the vanes 64. The lugs 66 may extend from the tips 64B of the vanes 64 along a direction being solely axial to facilitate their insertion in to the slots 37. Put differently, the lugs 66 are elongated along a direction of chords of the vanes 64. The lugs 66 are herein oblong, but they may alternatively be oval, circular, elliptical, circular, rectangular, and so on to name a few. Each of the lugs 66 may be replaced by two or more smaller protrusions, such as pins and so on.

Figure 12:
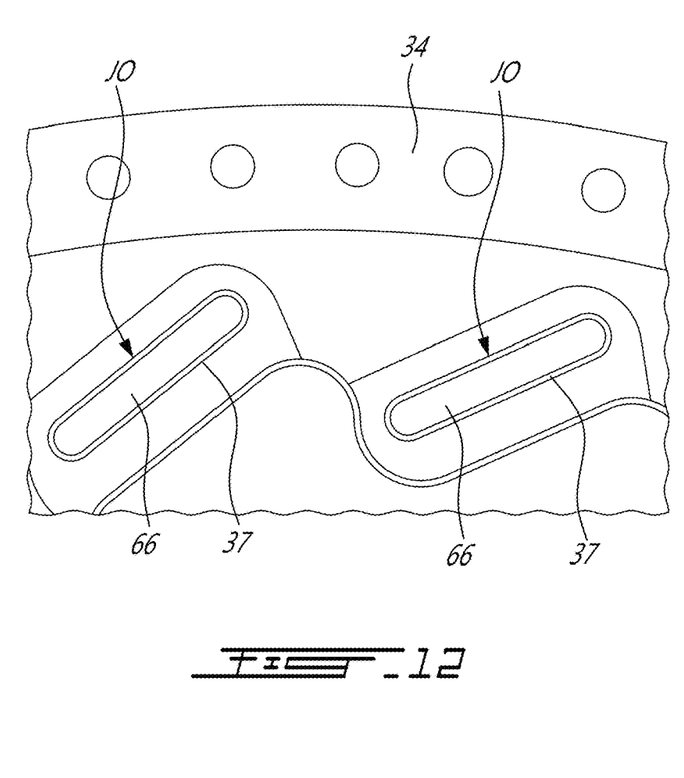
FIG. 12 is a front view of the diffuser.

Referring more particularly to FIG. 12, the lugs 66 are shown inserted into the slots 37. In some embodiments, braze joints J0, or weld joints, are used to fill gaps extending peripherally around the lugs 66 and between the lugs and peripheral faces bounding the slots 37. Therefore, the annular member 63 is secured to the bearing housing 30 via the lugs secured within the slots 37 via the braze joints J0. After the brazing of the annular member 63 to the bearing housing 30, these two components may become permanently attached to one another.

In such an embodiment, the connection between the annular member 63 and the bearing housing 30 is devoid of bolt. More specifically, typically, different parts of the compressor assembly 60, namely the bearing housing 30 and the annular member 63 are secured together via a plurality of bolts. In some cases, two bolts are used for each of the vanes 64. These bolts constitute important weight. The disclosed configuration using the slots and the lugs may eliminate the need for a bolted connection thereby decreasing a weight of the compressor assembly 60. Efficiency gains may therefore be achieved. Also, it may be impossible to cast the annular member 63 and the bearing housing 30 as a single piece because casting may not meet the required precision. The slots and lugs used herein may alleviate these drawbacks. Moreover, the bolt-free connection may eliminate or reduce leakage and may provide better radial containment capability than a bolted connection.

Referring back to FIG. 6, the compressor assembly 60 includes a compressed air collector 67 extending around the central axis A1. The internal combustion engine is fluidly connected to impeller 61 and to the flow passages 65 of the diffuser 62 via the compressed air collector 67. In some embodiments, the compressed air collector 67 includes: a collector base 68 abutting the front face 63A of the annular member 63 opposite the bearing housing 30, and a volute 69 extending around the central axis A1 and from the collector base 68 to a flange 69A; the flange 69A being secured to a housing flange of the bearing housing 30. As shown more distinctly in FIG. 2, a flow circulating area defined by the volute 69 increases along a flow direction towards the compressed air conduit 16.

Figure 13:
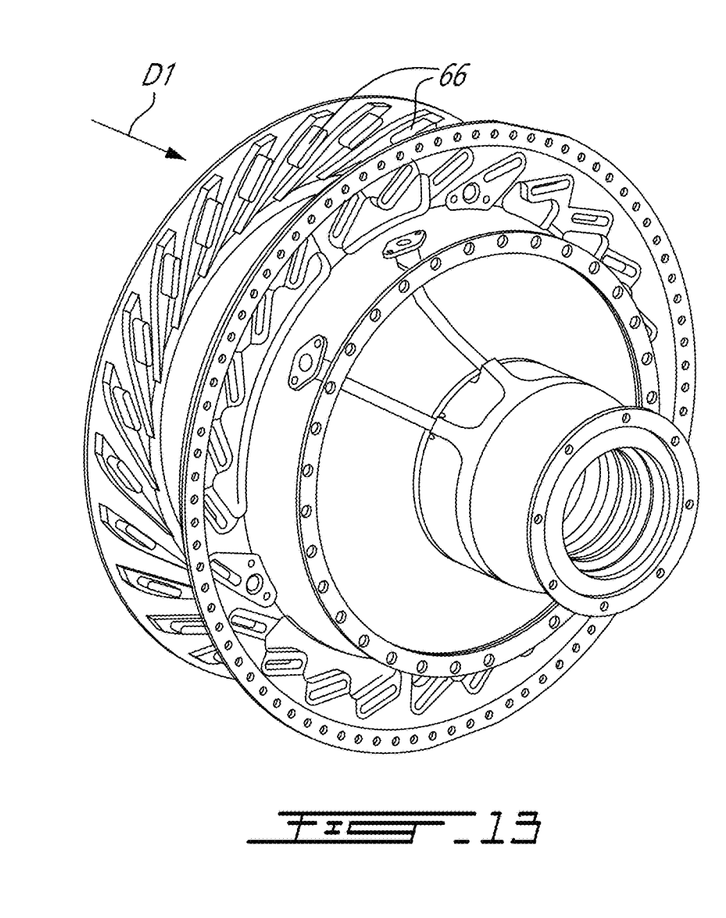
FIG. 13 is a rear three dimensional exploded view of the bearing housing and the diffuser.
Figure 14:
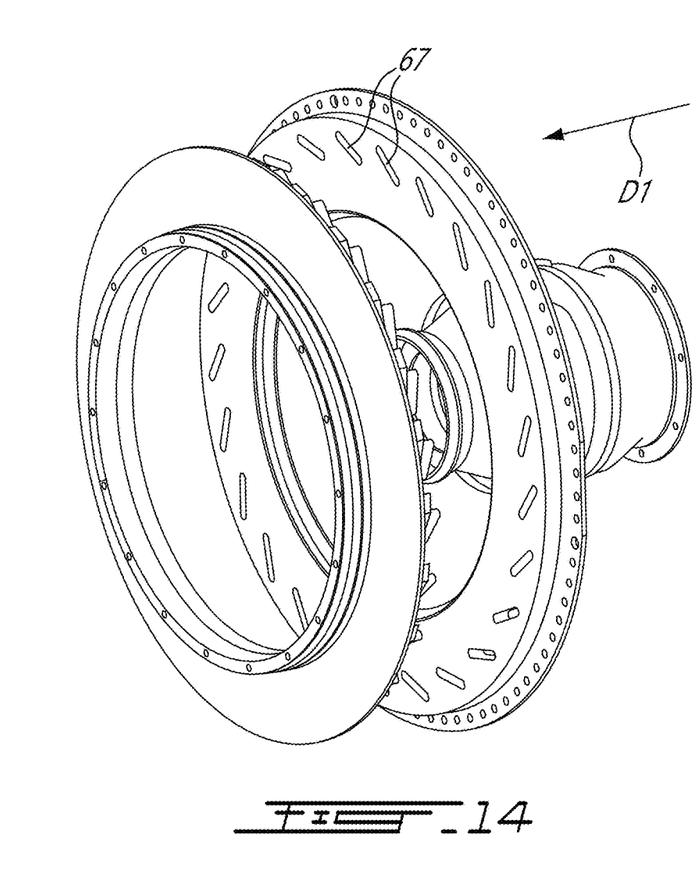
FIG. 14 is a side three dimensional view illustrated the bearing housing and the diffuser.

Referring now to FIGS. 13-14, to assemble the diffuser, the annular member 63 and the bearing housing 30 are moved one relative to the other along an axial direction denoted by arrow D1 until the lugs 66 are received into the slots 37. At which points, the gaps between the lugs 66 and the peripheral faces bounding the slots 37 may be filled with a material to create the braze joints J0 to permanently secure the bearing housing 30 to the annular member 63.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A compressor assembly comprising:
   an impeller rotatable about a central axis, the impeller mounted on a shaft;
   a bearing housing extending around the central axis and radially supporting the shaft; and
   a diffuser downstream of the impeller, the diffuser having:
      an annular member extending circumferentially around the central axis,
      vanes circumferentially distributed around the central axis and protruding from one of the annular member and the bearing housing, the vanes extending from bases at the one of the annular member and the bearing housing to tips at the other of the annular member and the bearing housing, and
      lug and slot connections defined between the annular member and the bearing housing to secure the annular member to the bearing housing, the lug and slot connections including lugs defined by one of the annular member and the bearing housing and slots defined by the other of the annular member and the bearing housing, braze or weld joints within gaps extending around the lugs, the lugs secured within the slots via the braze or weld joints.

2. The compressor assembly of claim 1, wherein the vanes are defined by the annular member, the lug and slot connections including slots defined through the bearing housing receiving lugs protruding from the vanes.

3. The compressor assembly of claim 2, wherein a number of the lugs corresponds to a number of the vanes.

4. The compressor assembly of claim 1, wherein a connection between the annular member and the bearing housing is devoid of bolt.

5. The compressor assembly of claim 2, wherein the lugs are elongated along a direction of chords of the vanes.

6. The compressor assembly of claim 1, comprising a compressed air collector extending around the central axis, the compressed air collector fluidly connected to flow passages defined between the vanes.

7. An aircraft engine, comprising:
   an internal combustion engine;
   a compressor including an impeller rotatable about a central axis, the impeller mounted on a shaft;
   a bearing housing extending around the central axis and radially supporting the shaft; and
   a diffuser downstream of the impeller, the diffuser fluidly connecting the compressor to the internal combustion engine, the diffuser having:
      an annular member extending circumferentially around the central axis and axially facing the bearing housing to define a flow path therebetween,
      vanes circumferentially distributed around the central axis and protruding axially from one of the annular member and the bearing housing across the flow path, the vanes extending from bases at the one of the annular member and the bearing housing to tips at the other of the annular member and the bearing housing, the vanes dividing the flow path into a plurality of inter-vane flow passages, and lugs protruding from the tips of the vanes outside of the flow path, the lugs received within correspondingly-shaped slots defined by the other of the annular member and the bearing housing, the lugs secured within the slots.

8. The aircraft engine of claim 7, wherein the vanes are defined by the annular member, the slots defined through the bearing housing.

9. The aircraft engine of claim 7, comprising braze or weld joints within gaps extending around the lugs, the lugs secured within the slots via the braze joints.

10. The aircraft engine of claim 7, wherein a number of the lugs corresponds to a number of the vanes.

11. The aircraft engine of claim 7, wherein a connection between the annular member and the bearing housing is devoid of bolt.

12. The aircraft engine of claim 7, wherein the lugs are elongated along a direction of chords of the vanes.

13. The aircraft engine of claim 7, comprising a compressed air collector extending around the central axis, the internal combustion engine fluidly connected to the inter-vane flow passages via the compressed air collector.

14. The aircraft engine of claim 13, wherein the compressed air collector includes:
a collector base abutting a front face of the annular member opposite the bearing housing, and
a volute extending around the central axis and from the collector base to a flange, the flange secured to a housing flange of the bearing housing.

15. The aircraft engine of claim 14, wherein a flow circulating area defined by the volute increases along a flow direction.

16. The aircraft engine of claim 7, further comprising:
a turbine including a turbine rotor rotatable about the central axis, a scroll case having an inlet fluidly connected to the internal combustion engine and an outlet fluidly connected to the turbine, and a conduit extending around the central axis from the inlet to the outlet, and
a turbine support case secured to the bearing housing, the turbine support case having spokes distributed around the central axis and extending along a direction having an axial component relative to the central axis, the spokes extending through the scroll case and radially supported by the bearing housing, a spoke of the spokes having a distal end secured to the bearing housing.

17. The aircraft engine of claim 16, wherein the scroll case includes vanes extending in a direction having an axial component relative to the central axis and across the conduit.

18. The aircraft engine of claim 17, wherein each of the spokes extends within a respective one of the vanes.

19. The aircraft engine of claim 18, wherein the spokes are free of connection to the vanes.

20. A compressor assembly comprising:
an impeller rotatable about a central axis, the impeller mounted on a shaft;
a bearing housing extending around the central axis and radially supporting the shaft; and
a diffuser downstream of the impeller, the diffuser having:
an annular member extending circumferentially around the central axis,
vanes circumferentially distributed around the central axis and protruding from one of the annular member and the bearing housing, the vanes extending from bases at the one of the annular member and the bearing housing to tips at the other of the annular member and the bearing housing, and
lug and slot connections defined between the annular member and the bearing housing to secure the annular member to the bearing housing, a connection between the annular member and the bearing housing is devoid of bolt.

* * * * *